United States Patent

Gove et al.

[11] Patent Number: 5,598,188
[45] Date of Patent: Jan. 28, 1997

[54] MEMORY ARCHITECTURE FOR REFORMATTING AND STORING DISPLAY DATA IN STANDARD TV AND HDTV SYSTEMS

[75] Inventors: Robert J. Gove, Plano, Tex.; Keiichiroh Abe; Sohichiroh Kamei, both of Tsukuba, Japan; Donald B. Doherty, Irving, Tex.

[73] Assignee: Texas Instruments Incorporated, Dallas, Tex.

[21] Appl. No.: 476,162

[22] Filed: Jun. 7, 1995

Related U.S. Application Data

[62] Division of Ser. No. 333,199, Nov. 2, 1994, abandoned.

[51] Int. Cl.$^6$ ........................................................ G09G 5/00
[52] U.S. Cl. ........................... 345/185; 345/154; 345/187
[58] Field of Search ................................... 345/154, 155, 345/185, 187; 364/725

[56] References Cited

U.S. PATENT DOCUMENTS

| | | |
|---|---|---|
| 4,335,393 | 6/1982 | Pearson . |
| 4,758,884 | 7/1988 | Roy . |
| 4,819,068 | 4/1989 | Cooper et al. . |
| 4,897,799 | 1/1990 | Le Gall et al. .................... 345/155 X |
| 5,126,962 | 6/1992 | Chiang .................................. 364/725 |
| 5,227,875 | 7/1993 | Suu et al. ........................... 364/725 X |
| 5,255,100 | 10/1993 | Urbanus ................................ 358/231 |
| 5,307,056 | 4/1994 | Urbanus . |

FOREIGN PATENT DOCUMENTS

| | | |
|---|---|---|
| 0507270A1 | 7/1992 | European Pat. Off. . |
| 0530759A3 | 3/1993 | European Pat. Off. . |
| 0550887A1 | 7/1993 | European Pat. Off. . |
| 0655723A1 | 5/1995 | European Pat. Off. . |

OTHER PUBLICATIONS

B. Clifton et al, "Hardware Architectures for Video–Rate, Active Addressed STN Displays", Japan Display, 1992, pp. 503–506.

T. J. Scheffer, et al., "Active Addressing Method for High–Contrast Video–Rate STN Displays," Sid, 1992, Digest, pp. 228–231.

*Primary Examiner*—Ulysses Weldon
*Attorney, Agent, or Firm*—Charles A. Brill; James C. Kesterson; Richard L. Donaldson

[57] ABSTRACT

A data reformatter/frame memory (112) for efficiently orthogonally reordering a digital data stream. The disclosed reformatter/frame memory (112) is typically used in conjunction with a display device (124) for displaying the digital data, and a display controller (132) for coordinating the transfer of data between the reformatter/frame memory (112) and the display device (124). According to one embodiment, a data reformatter for a video display system includes at least one reformatter memory plane (60). The memory plane (60) comprises an input bus, an m×n array of memory cells (80) in communication with the input bus, and an m-bit-wide output bus. The array of memory cells (80) receives and stores m n-bit-wide input data words and outputs n m-bit-wide output data words. Each of the m-bit-wide output data words is comprised of one bit from each of the m n-bit-wide input data words.

7 Claims, 5 Drawing Sheets

MEMORY ARCHITECTURE FOR REFORMATTING AND STORING DISPLAY DATA IN STANDARD TV AND HDTV SYSTEMS

This is a divisional of application Ser. No. 08/333,199 filed on Nov. 2, 1994 now abandoned.

FIELD OF THE INVENTION

This invention relates to the field of display systems, more particularly to image data manipulation circuits used in digital television display systems.

BACKGROUND OF THE INVENTION

Display systems such as televisions display full-motion video images as a series of still frames. Each frame of the image is comprised of a two-dimensional array of picture elements, known as pixels, arranged in orthogonal rows and columns. The image information is transmitted in a raster-scan format, one line at a time from top to bottom. Within each line the pixel information is transmitted from left to fight. Standard television systems in the United States have 480 rows with a resolution of approximately 572 pixels in each row. Video Graphic Adapter (VGA) standards specify an image comprised of 480 rows of 640 pixels. Wide-NTSC television standards specify an image 853 pixels wide and 480 rows high. While there is no universally accepted standard for high-definition television, some formats display up to 1152 rows with 2048 columns.

Because standard television broadcasts transmit an analog signal, each pixel in the row is not sent as a discrete unit, but rather the entire row is transmitted as an analog signal from left to right. Analog display devices such as cathode ray tubes (CRT) accept raster-scan image data and project it onto the display screen in real-time, one line at a time as it is received. However, many digital display systems require the data to be displayed an entire screen at a time. This requires the data to be stored as it is received until all the data for a given screen is ready to be displayed. An efficient data storage means is one aspect of this invention.

Thus far, the description of the image data transfer has referred to the image data for a single pixel as an indivisible unit. However, digital display systems require image data that is comprised of one or more weighted binary bits. Digital systems that have more than one bit of image data typically transmit all bits for a given pixel in parallel. For example, a three color display having eight bits of data for each color typically transmits one 24-bit-wide word for each pixel. If the digital display pixel can only display one bit at a time, each of the 24 bits must be displayed sequentially in order to create the desired intensity level and color for the pixel. One method of generating the required "gray scale" is pulse width modulation as described in commonly assigned U.S. Pat. No. 5,278,562 entitled "DMD Architecture and Timing for use in a Pulse-Width Modulated Display System."

Using the method taught in the above referenced patent and assuming an 8-bit monochrome system, the 8-bit image is displayed as a series of 8 1-bit images or "bit planes." Each bit plane is displayed for a period of time that is directly related to the significance of the bit. For example, a bit plane comprised of the most significant bit from each of the data words representing a pixel is extracted and displayed for a period of time. A second bit plane, comprised of the next most significant bit from each data word is then extracted and displayed for a period of time half as long as the first period. This process continues until each bit in the data word has been displayed.

The image data is received as a serial stream of pixels, with each pixel comprised of parallel data bits, and displayed as a serial stream of bit planes, with each bit plane comprised of one data bit for each pixel. An efficient means of translating the image data from the bitparallel, pixel-serial format to the pixel-parallel, bit-serial format is desired and is one aspect of the present invention.

SUMMARY OF THE INVENTION

A data reformatter/frame memory is disclosed that provides an efficient means of performing an orthogonal reordering of data pixels. The data reformatter allows the conversion of a stream of first data words into a stream of second data words wherein each second data word contains one bit from each of the first data words. The disclosed frame memory stores the stream of second data words until the data words are required for display.

According to one embodiment, the data reformatter includes at least one reformatter memory plane which includes an m×n array of memory cells for receiving and storing m n-bit-wide input data words from an input bus, and for outputting n m-bit-wide output data words to an output data bus. Wherein the m-bit-wide output data words are comprised of one bit from each of the m n-bit-wide input data words.

According to another embodiment of the disclosed invention, a display system is comprised of a data reformatter, a display device, and a controller for coordinating the operation of the data reformatter and the display device. The data reformatter is comprised of an m×n array of memory cells for receiving and storing m n-bit-wide input data words, and for outputting n m-bit-wide output data words. Wherein the m-bit-wide output data words are comprised of one bit from each of the m n-bit-wide input data words.

The disclosed data reformatter/frame memory enables the processing of video data wherein m n-bit input data words are written into a reformatter memory, and n m-bit output data words, each comprised of one bit from each of the input data words, are read out of the reformatter memory. The n m-bit output data words are typically stored in a frame memory until the data is displayed.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE PREFERRED EMBODIMENTS

Figure 1:
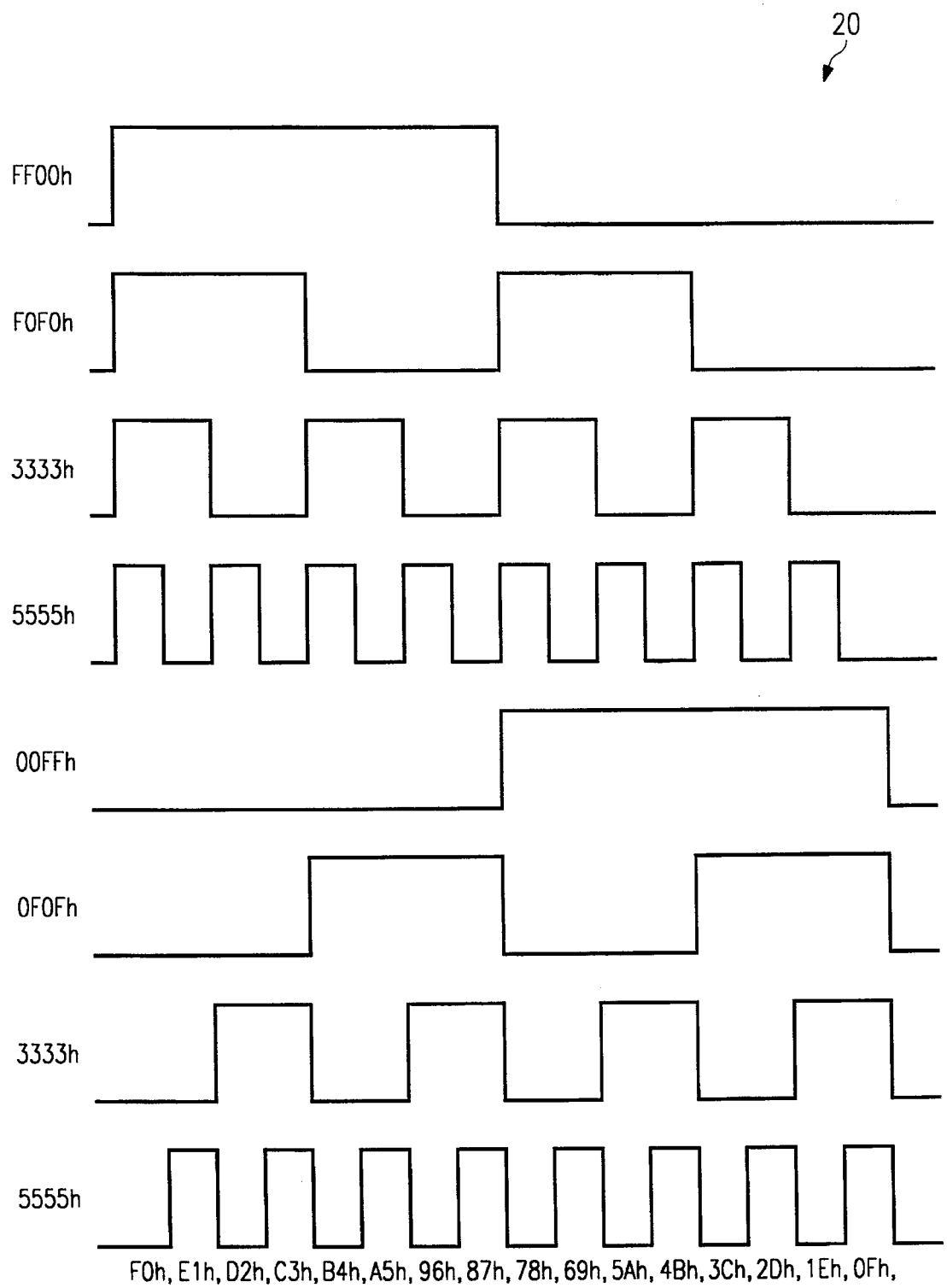
FIG. 1 is a waveform diagram showing 8-bits of image data for each of 16 pixels.

FIG. 1 depicts 8 waveforms 20 representing a series of 8-bit binary image data words for a row of sixteen pixels. Below the waveform 20 in FIG. 1, is a hexadecimal representation of the binary value of the image data for each of the 16 pixels. Where required for clarity, hexadecimal numbers within this disclosure will be followed by a 'h' character. The image data for the 16 pixels would be transmitted as the series of 16 8-bit data words shown beneath the waveforms of FIG. 1. As discussed above, data of a given bit significance for all pixels in a row is input into a digital display simultaneously. For example, the image data shown in FIG. 1 is received as a series of 16 8-bit words, F0h, E1h, D2h, C3h, B4h, A5h, 96h, 87h, 78h, 69h, 5Ah, 4Bh, 3Ch, 2Dh, 1Eh, 0Fh, but is loaded into the display device as a series of 8 16-bit words FF00h, F0F0h, 3333h, 5555h, 00FFh, 0F0Fh, 3333h, 5555h. he function performed to achieve this regrouping is referred to as orthogonal reordering. One function of the reformatter memory disclosed herein is to perform the orthogonal reordering by receiving a data stream from a video source in one format, and changing the order that the data bits are output to the order required by the display device.

Figure 2:
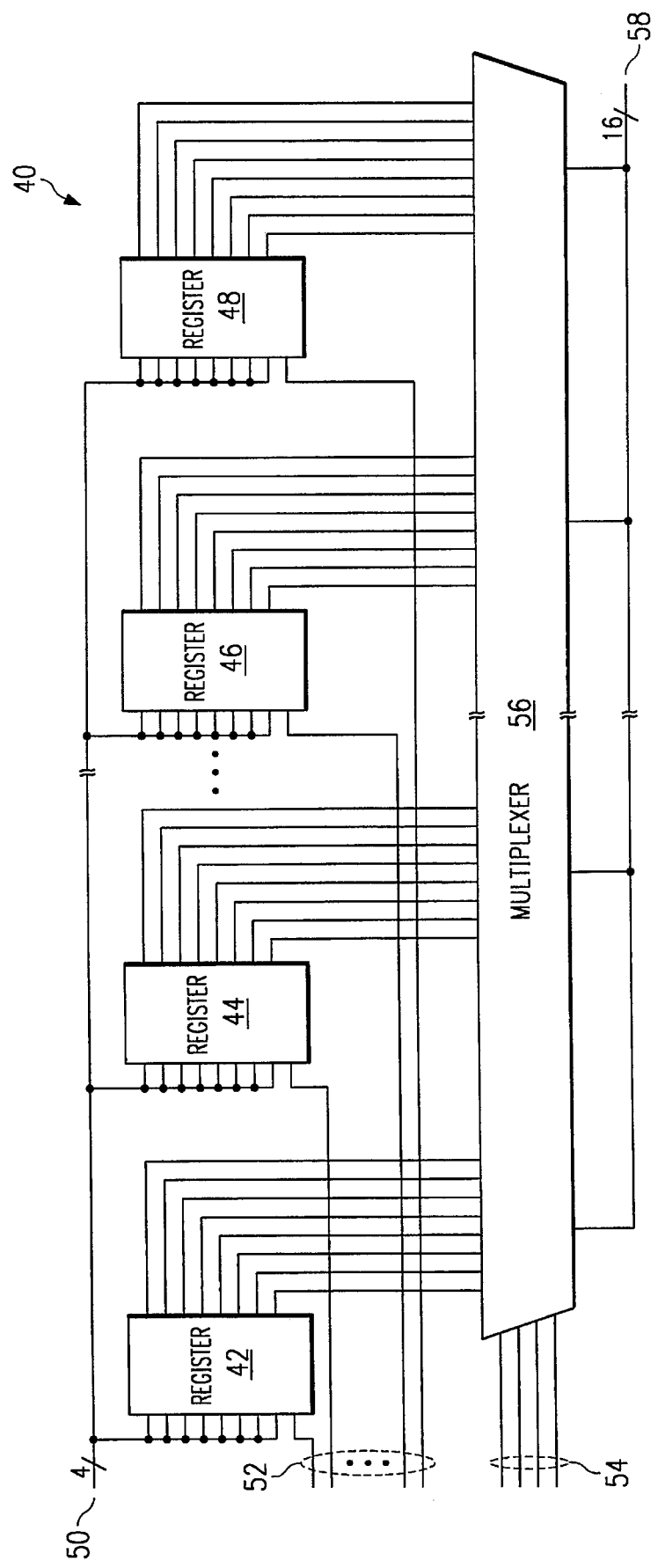
FIG. 2 is a schematic of one embodiment of the reformatter circuit according to the present invention.

One method of achieving this reordering is shown in FIG. 2. As data for the 16 pixels of a row is received by the reformatter 40, each word is written into a separate register. In FIG. 2, the data word for pixel 1 is written into register 42, the second word is written into register 44, and the sixteenth word is written into register 48. After all of the words have been written into the registers, the data is read out of the reformatter 40 and stored in a frame memory. FIG. 2 shows a multiplexer 56 that is used to select which bit from each of the 16 registers to be output to the frame memory. If the outputs of the registers could be individually enabled, the outputs of each register could be interconnected and the multiplexer 56 would be unnecessary. FIG. 2 illustrates only the mechanics of data reformatting, there are other possible circuits that perform the same function. For example, rather than use registers and a multiplexer 56, standard RAM cells could be used with orthogonal read and write enable signals.

Figure 3:
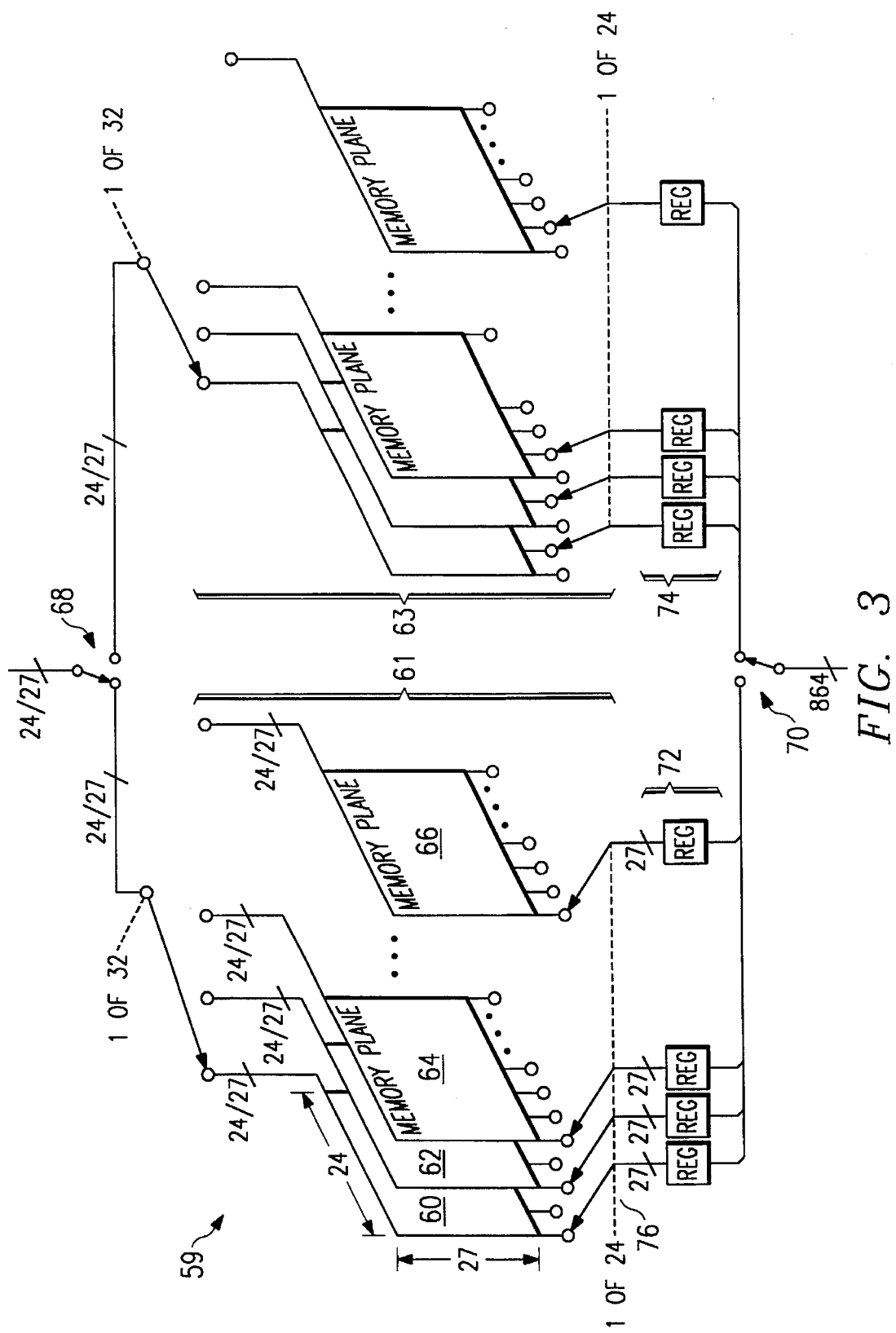
FIG. 3 is a block diagram of one embodiment of a reformatter circuit according to the present invention.

FIG. 3 is a schematic view of another embodiment of a data reformatter circuit 59. In the example shown in FIG. 3, each data word is 24 bits wide and contains 8 bits of intensity data for each of 3 colors. The reformatter circuit 59 shown in FIG. 3 is designed to reformat the data for a wide-NTSC image. As described in co-filed, commonly assigned U.S. patent application Ser. No. 08/332,545, "Digital Micromirror Architecture for Wide Display Applications," it is envisioned that a modulator with a horizontal resolution of 864 pixels will be used to display the 853-pixel wide-NTSC image. Because 864 is a multiple of 16, the digital processing circuitry may be simplified by adding an extra 11 pixels. The extra 11 pixels in each row may be used to center the displayed image and to simplify the circuitry required to change from front to rear image projection. The reformatter illustrated in FIG. 3 holds image data for two rows of 864 (32×27) pixels. Data for one row of pixels is written into half of the reformatter 61 while data for the other row is being read out of the other half of the reformatter 63. Each half of the data reformatter 61, 63 is comprised of 32 individual memory planes 60, 62, (64, 66, each of which reformats the video data words for 27 pixels. One data word for each pixel in a row is written into the memory planes 60, 62, 64, 66 at a time. Data for pixels 1 through 27 is written into memory plane 60. Plane 62 holds data for pixels 28 through 54. Plane 66 holds data for pixels 838 through 864. After writing one row of data to the first half of the reformatter 61, switch 68 directs the second row of data into the second half of the reformatter 63 while switch 70 allows the first row of data to be read from the first half of the reformatter 61.

Data is read from the reformatter 59 in 24 words that are 864 bits wide. Each word contains 27 bits from each of the 32 memory planes in the reformatter memory and is comprised of the same weight bit from every pixel in a row. An array of 32 27-bit registers 72, 74 at the output of each half of the reformatter 61, 63 latches the reformatted output dam. After one read cycle, in which all of the image data for one weight value is read out, switch 76 is incremented to select the next bit value to be output. Because data is written into the reformatter 59 in 24-bit words and read out of the reformatter 59 in 864-bit words, filling the reformatter requires 864 write cycles but emptying the reformatter only requires 24 read cycles.

One feature of the disclosed data reformatter 59, is the ability to pass data through the reformatter 59 without reformatting the data. This feature simplifies fault isolation between the data reformatter 59 and a frame storage memory used to store the reformatted output data. The input busses to the data reformatter memory planes 60, 62, 64, 66 are 27 bits wide. When the data reformatter 59 is in a reformat mode, only 24-bit data words are written into the data reformatter 59 leaving the remaining 3 bus lines unused. When the data reformatter 59 is in a test mode, 27-bit data words are written into the data reformatter 59. In the test mode, the 27 input lines are connected to the 27 output lines from each memory plane 60, 62, 64, 66 allowing the test data to be written directly into the output register array 72, 74 without first being stored by the memory planes 60, 62, 64, 66. In reformat mode, all 32 of the 27-bit output registers in an array 72, 74 are latched simultaneously. In test mode, the registers may be individually latched to allow unique data to be written into each of the registers.

The sizes of the data words and reformatter memories used in the above description were selected for illustrative purposes. For example, one embodiment may use only 16 memory planes 60, 62, 64, 66 instead of the 32 memory planes 60, 62, 64, 66 described above. This would reduce the capacity of each half of the reformatter 61, 63 from one line of data to onehalf of line of data. The output word from the reformatter 59 would be 432 bits wide and contain one bit of data for half of the pixels in a row. In another embodiment, a data reformatter 59 designed for use in a VGA compatible display system may contain only 10 memory planes 60, 62, 64, 60, each of which holds 32 24-bit words, enabling each half of the reformatter 61, 63 to contain all of the data for one-half of a row of 640 pixels.

Another feature of the disclosed reformatter 59 is the ability of the reformatter 59 to efficiently reverse a bit-plane in order to allow either front or rear projection of the image. The only change that must occur in order to reverse a bit-plane using the disclosed reformatter 59 is the order that the memory planes 60, 62, 64, and 66 are filled. For example, if a front-projection display system writes to the reformatter 59 in order from the first location of memory plane 60 to the last location of memory plane 66, the system may be changed to a rear-projection display merely by filling the memory planes 60, 62, 64, 66 from the last location of memory plane 66 to the first location of memory plane 60. All other operations, including the order in which data is read out of the memory, remain unchanged.

Figure 4:
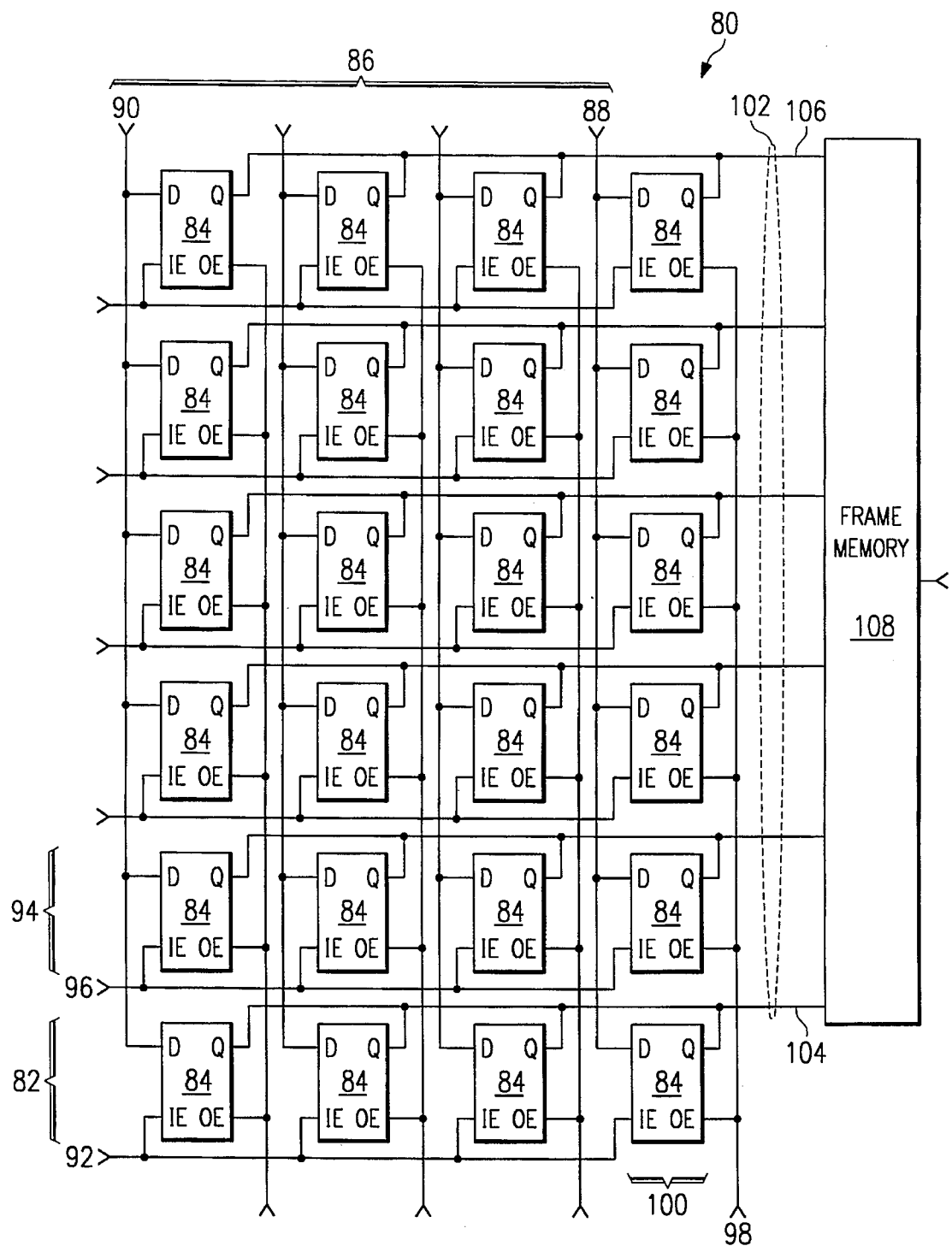
FIG. 4 is a schematic of one embodiment of the reformatter function according to the present invention.

FIG. 4 is a schematic view of a typical memory plane 80 similar to the memory planes 60, 62, 64, and 66 shown in FIG. 3. Memory plane 80 holds a 4-bit word for each of six pixels in a row. The data word for the first pixel is written into the first row 82 of four memory cells 84 in the memory plane 80 through the input data bus 86, the least significant bit on signal 88 and the most significant bit on signal 90. The memory write cycle for memory cells 84 is enabled by row enable signal 92. Data for the second pixel is loaded into the second row 94 of memory cells using row enable signal 96. The third through the sixth image data words are then written into the memory plane 80, filling all of the memory cells 84 in the memory plane 80.

Data is read out of the array of memory cells 84 one column at a time. For example, column output enable signal 98 enables memory cell column 100 to drive the data output bus 102. Memory cell column 100 drives the least significant bit of the data word for pixel 1 onto line 104 and the least significant bit of the data word for pixel 6 onto line 106. The image data output by the reformatter 80 may be stored in a frame memory until it is necessary to display the data. Prior art data reformatters have performed a parallel to serial conversion on the reformatted data in order to avoid an excessive number of interconnections between the data reformatter and the frame memory. The parallel to serial conversion was typically performed by an array of parallel-input shift registers on the output of the data reformatter. The present invention envisions combining a data reformatter 59 and a frame memory in a single integrated circuit, eliminating the need for the array of shift registers.

Figure 5:
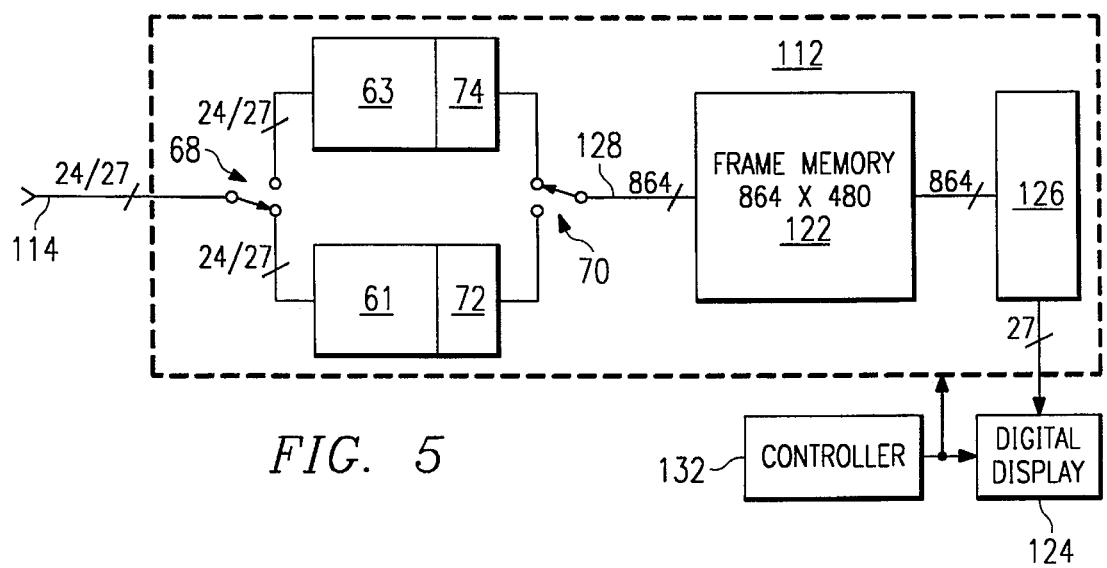
FIG. 5 is a block diagram of the disclosed reformatter/frame memory according to one embodiment of the present invention.

FIG. 5 is a block diagram of reformatter/frame memory 112 according to the present invention. Data representing one row of pixels is input via input bus 114 into one half of the reformatter 61. After the first half of the reformatter 61 is full of data, the positions of switches 68 and 70 are changed to allow the next row of data to be written into second half of the reformatter 63 while the first row of reformatted data is being read from the first half of the reformatter 61 and into the frame memory 122 where it is stored until required for display.

The interface between the frame memory 122 and the digital display device 124 includes two shift register arrays to reduce the number of interconnections. The first shift register array 126 is fabricated on the reformatter/frame memory 112 integrated circuit and, according to one embodiment of the present invention, is comprised of 27 32-bit parallel-input serial-output shift registers. Data for one row of the display is loaded into the first shift register array 126 and shifted out in the form of 32 27-bit words. Each of the 27-bit data words is comprised of one bit from every 32nd pixel in the row. The digital display device 124 includes a second array of input shift registers that receive the 32 27-bit data words and perform a serial to parallel conversion on the data to recreate the 864-bit-wide data word.

The controller 132 shown in FIG. 5 supplies the address data, timing signals, and switch control signals to the reformatter/frame memory 112 and the display device 124 which are necessary to coordinate the transfer of data through the reformatter/frame memory 112 to the display device 124.

Figure 6:
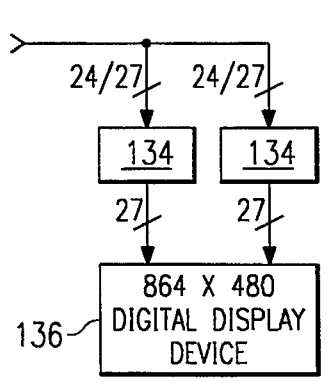
FIG. 6 is a block diagram of one embodiment of a display system which includes two reformatter/frame memories according to the present invention.

FIGS. 6, 7, 8, and 9 are block diagrams showing a reformatter/frame memory and digital display device in four different digital television systems. FIG. 6 illustrates the use of two reformatter/frame memories 134, each of which stores data for one-half row of pixels. Each reformatter/frame memory 134 includes an array of 27 16-bit shift registers which allow one row of pixel data to be read from the frame memories in 16 words.

Figure 7:
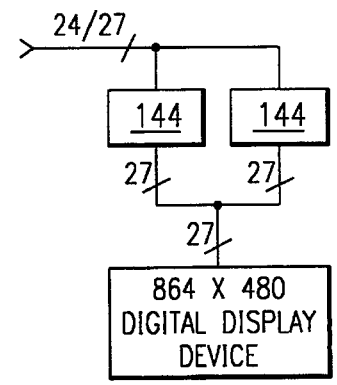
FIG. 7 is a block diagram of one embodiment of a display system which includes two reformatter/frame memories according to the present invention.

The display system in FIG. 7 alternates between two reformatter/frame memories 144 in a ping-pong fashion. In FIG. 7 each reformatter/frame memory 144 store an entire frame and are used to output one frame while the other reformatter/frame memory 144 is being written to. In this case dimensions of the reformatter/frame memory are the same as discussed above for FIG. 5.

Figure 8:
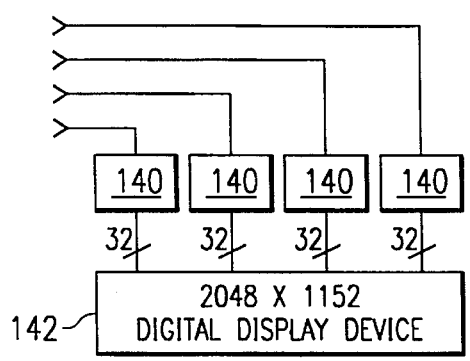
FIG. 8 is a block diagram of one embodiment of a display system which includes four reformatter/frame memories according to the present invention.

FIG. 8 shows the use of four reformatter/frame memories 140 to reformat and store one frame of video data. In FIG. 8 each reformatter/frame memory 140 stores one-fourth of each line of the video data. Each quarter line of data is transferred between a reformatter/frame memory 140 and the digital display device 142 in 16 32-bit words. The digital display device 142 receives the 32-bit words in parallel and converts them into one 2048-bit word using the shift register technique discussed above. The reformatter/frame memories 140 separately reformat the left, left center, right center, and right quarters of each row.

Figure 9:
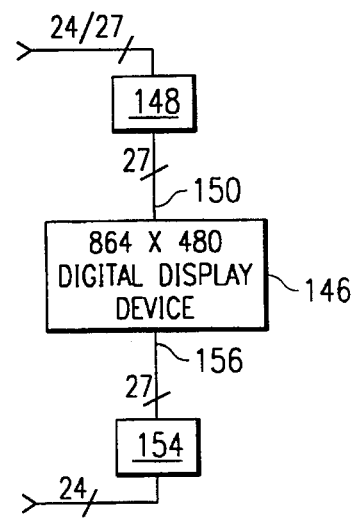
FIG. 9 is a block diagram of one embodiment of a display system which includes two reformatter/frame memories according to the present invention.

FIG. 9 shows the use of two separate data paths onto the digital display device 146. One data reformatter/frame memory 148 loads data into half of the digital display device, in this example lines 1 through 240, using a first data path 150. The second data reformatter/frame memory 154 loads data into the other half of the digital display device, lines 241 through 480, using data path 156.

Although the above examples have referred to the display device as being a digital display, it should be understood that the digital image data may be convened to analog image data and displayed on an analog display device.

Thus, although there has been disclosed to this point a particular method for reformatting and storing digital image data, and a particular embodiment of a device therefore, it is not intended that such specific references be considered as limitations upon the scope of this invention except in-so-far as set forth in the following claims. Furthermore, having described the invention in connection with certain specific embodiments thereof, it is to be understood that further modifications may now suggest themselves to those skilled in the art, it is intended to cover all such modifications as fall within the scope of the appended claims.

What is claimed is:

1. A method of processing video data, said method comprising the steps of:

selecting a memory plane in a first half of a reformatter memory, said reformatter memory comprising said first half and a second half, each of said first and said second halves comprised of multiple memory planes, each memory plane comprising m memory locations, each of said memory locations capable of holding an n-bit input data word;

writing up to m n-bit input data words into said selected memory plane;

repeating said selecting and writing steps until all of said memory planes in said first half of said reformatter memory have been written to; and reading n m-bit output data words from each of said memory planes in said first half of said reformatter memory, each of said m-bit output data words comprising one bit from each of said m n-bit input data words written into said selected memory plane.

2. The method of claim 1 further comprising the steps of:

writing said n m-bit output data words into a frame memory; and reading said n m-bit output data words out of said frame memory.

3. The method of claim 1 said step of reading n m-bit output data words comprising:

reading n m-bit output data words out of said reformatter memory, said output data words comprising one bit from each of said input data words, wherein the most significant bit of said output data word is from the first said input data word written to said reformatter memory, and the least significant bit of said output data word is from the last said input data word written to said reformatter memory.

4. The method of claim 1 said step of reading n m-bit output data words comprising:

reading n m-bit output data words out of said reformatter memory, said output data words comprising one bit from each of said input data words, wherein the most significant bit of said output data word is from the last said input data word written to said reformatter memory, and the least significant bit of said output data word is from the first said input data word written to said reformatter memory.

5. The method of claim 2 further comprising the step of converting said m-bit output data words read out of said frame memory from parallel to serial format.

6. The method of claim 1 further comprising the steps of:

selecting a memory plane in said second half of a reformatter memory;

writing up to m n-bit input data words into said selected memory plane in said second half of said reformatter memory;

repeating said selecting and writing steps to said memory plane in said second half of said reformatter memory until all of said memory planes in said second half of said reformatter memory have been written to; and reading n m-bit output data words from each of said memory planes in said second half of said reformatter memory, each of said m-bit output data words comprising one bit from each of said m n-bit input data words written into said selected memory plane.

7. The method of claim 6 where said selecting and writing steps are performed to memory planes in said second half of said reformatter memory while said reading step is performed to memory planes in said first half of said reformatter memory.

* * * * *